United States Patent [19]

Scott et al.

[11] Patent Number: 5,211,194
[45] Date of Patent: May 18, 1993

[54] FUEL CONTROL VALVE

[75] Inventors: Richard E. Scott; Thomas G. Morgan, both of Naples, Fla.; James Cline, East Hampton, N.Y.

[73] Assignee: Shaw Aero Development, Inc., Naples, Fla.

[21] Appl. No.: 923,696

[22] Filed: Jul. 31, 1992

[51] Int. Cl.⁵ .......................................... F16K 11/076
[52] U.S. Cl. ..................................... 137/590; 137/601
[58] Field of Search ............................. 137/590, 601

[56] References Cited

U.S. PATENT DOCUMENTS

| | | | |
|---|---|---|---|
| 1,050,181 | 1/1913 | Turner | 137/601 |
| 1,470,775 | 10/1923 | Stephens | 137/590 X |
| 1,521,817 | 1/1925 | Jerdone, Jr. | |
| 1,605,619 | 11/1926 | Schreiner | |
| 1,605,711 | 11/1927 | Hatfield | 137/590 X |
| 1,698,616 | 1/1929 | Woodham | 137/71 X |
| 2,563,244 | 8/1951 | Holicer | 137/797 |
| 2,765,801 | 10/1956 | Selim | 137/71 |
| 3,390,698 | 7/1968 | Cormicheal et al. | 137/590 X |
| 3,603,347 | 9/1971 | Paolini | 137/625.17 |
| 3,930,517 | 1/1976 | Gagala | 137/71 X |
| 4,250,921 | 2/1981 | Pingel et al. | 137/590 X |
| 4,957,138 | 9/1990 | Pingel et al. | 137/590 X |

FOREIGN PATENT DOCUMENTS

| | | | |
|---|---|---|---|
| 7407367 | 10/1975 | France | 137/590 |
| 434777 | 5/1948 | Italy | 137/590 |

OTHER PUBLICATIONS

Drawing by James W. Cline, dated May 5, 1989.

*Primary Examiner*—Stephen M. Hepperle
*Attorney, Agent, or Firm*—Pennie & Edmonds

[57] ABSTRACT

A manually operated fuel control valve having at least two operating positions, one being an "on" position for feeding fuel through a main fuel inlet when the fuel tank is full and the other a "reserve" position for feeding fuel through a reserve fuel inlet when the fuel tank is nearly depleted. The valve includes a valve closure means which is disposed in a partial sealing relation with the reserve inlet when fuel is being fed through the main inlet. The fuel valve also includes a shear zone to cause the valve to break away from the fuel tank in the event of an accident. The internal parts of the valve are biased toward a valve closing position to immediately shift and completely close the valve against further flow of fuel upon breaking of the valve.

10 Claims, 3 Drawing Sheets

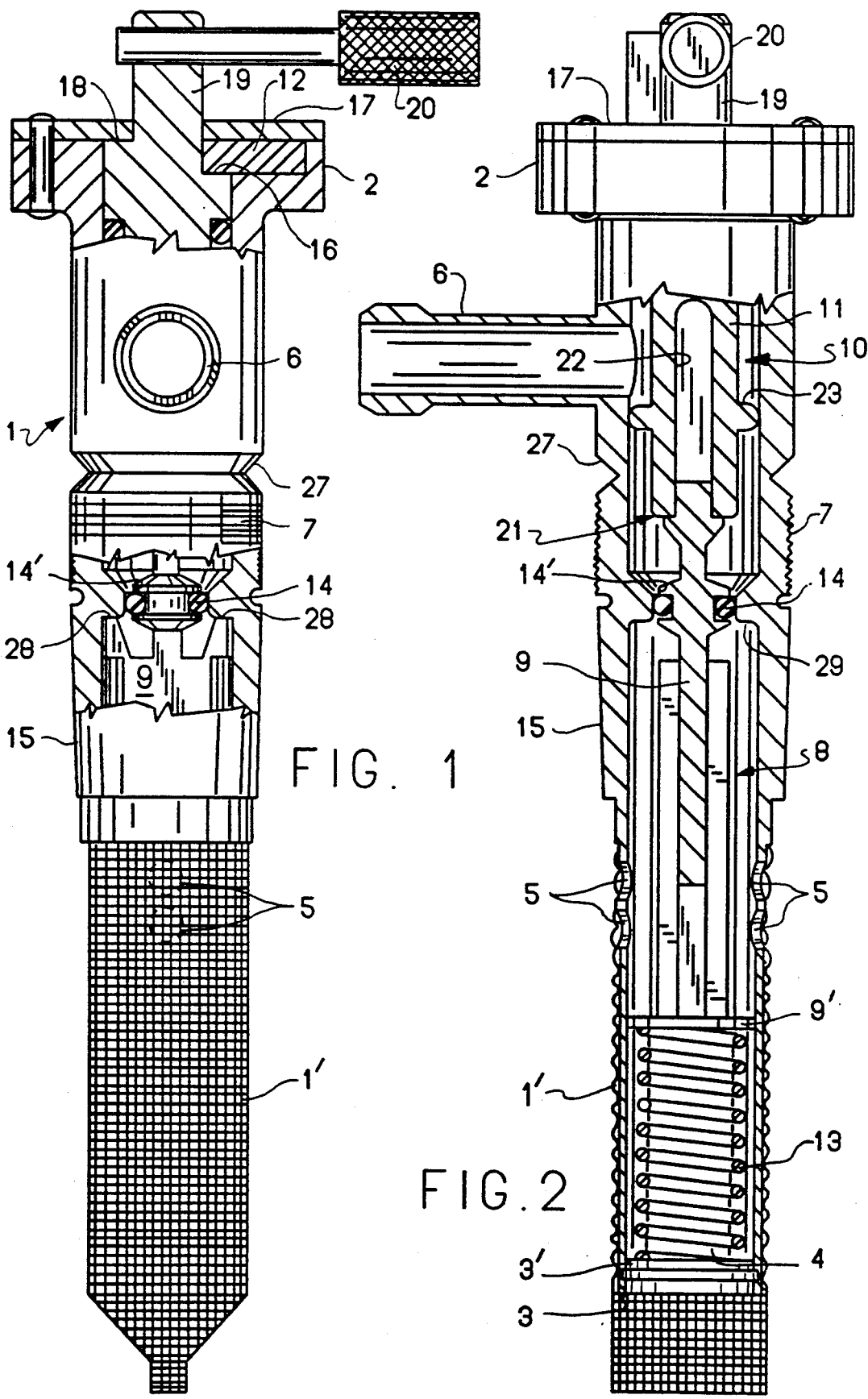

FUEL CONTROL VALVE

BACKGROUND OF THE INVENTION

Manually operated fuel control valves for vehicles, such as motorcycles, are typically constructed for operating at two or three positions of the valve. An "on" position for use when the fuel tank is full, and a "reserve" position when the fuel tank is nearly depleted and possibly a third "off" position closing the valve against flow of fuel. To control the position of the valve, a manually operable valve control is provided. When fuel in the tank lowers to a prescribed level, the fuel inlet for the "on" position rises above the level of fuel. With no more fuel going through the valve the engine stops and the operator is immediately warned to shift the control valve to the "reserve" position. The user now knows that there is a minimal amount of fuel in the tank and that filling is required.

Valves of the type described above may also include a third "off" position for the valve control wherein the valve is shut off completely against the flow of fuel. This third "off" position is advantageous as a safety feature and also permits repair work to be done on the engine without disconnecting the fuel supply.

Typically, the operation of the valve between the two fuel feeding positions is affected by rotation of the valve control, whereas movement of the valve o control to the third position closing the valve is an axial movement. A valve as described above, is disclosed in U.S. Pat. No. 4,250,921.

Prior valve constructions of the type described above, although providing a degree of warning to the user that the fuel tank is nearly depleted, do so by completely cutting off the supply of fuel and by requiring the operator to shift the valve to the reserve position before the flow of fuel is recommenced. This can, to say the least, be disconcerting. It may also cause stalling of the engine to which the fuel is supplied. If the valve is not immediately attended to and adjusted, this immediate requirement may be of some danger to the motorcyclist, depending on the situation in which it occurs.

The valves described above are typically mounted on the bottom of the fuel tank for gravity feed of the fuel through the valve and to the motorcycle engine. A portion of the valve is exposed externally of the fuel tank for control by the motorcyclist. In an accident or other mishap where the exposed valve portion receives a sharp impact blow or other damaging force, it can be broken away from the fuel tank. This in turn will permit the free escape of fuel from the tank, thus producing an obviously dangerous situation.

SUMMARY OF THE INVENTION

In accordance with the present invention, a fuel valve of the general construction described above is improved by providing a unique control mechanism, whereby fuel flow is not completely cut off at the point in time when shifting of the valve to the reserve supply is required. In particular, the improved valve construction includes a valve closure means which is disposed in a partial sealing relation with the reserve inlet opening to the valve while fuel is being feed through the main inlet opening. Thus, when the fuel tank is full, fuel flows primarily into the main fuel inlet of the valve while an additional small amount of fuel flows into the valve through the reserve inlet.

When the fuel within the tank is depleted to a level where the main inlet is no longer functional, the supply of fuel through the valve is not completely terminated. Rather, a small amount of fuel flow continues through the partially closed reserve inlet. The amount of fuel flowing will cause the engine to sputter and announce to the motorcyclist that it is necessary to switch the valve to the reserve position. This signal to the operator, will however, be made without shutting off the supply of fuel. Thus, the motorcyclist can continue for at least a short period without shifting the valve to the reserve position. This can be useful where, for example, traffic conditions do not permit immediate attention to the fuel valve.

In addition, the fuel valve of the present invention includes a shear zone in the outer valve o body portion of the valve. This zone is located immediately outwardly of connection point of the valve to the fuel tank and provides a weakened area whereby impact of the exposed portion of the valve will cause the valve body to break along the shear zone. The internal parts of the valve are constructed whereby removal of the exterior body will cause the valve to immediately shift to the "off" position to completely close the valve against further flow of fuel. To effect this result, all of the internal parts of the valve located externally of the fuel tank are removably connected to the internal parts of the valve which are located internally of the fuel tank.

BRIEF DESCRIPTION OF THE DRAWINGS

FIG. 1 is a side elevation of the valve of the present invention in the "off" position with exterior parts broken away and the exposed internal parts shown in cross-section;

FIG. 2 is another side evalational view of the valve shown at right angles to the view of FIG. 1, and with more of the internal parts shown in cross-section;

DETAILED DESCRIPTION OF THE INVENTION

Figure 3:
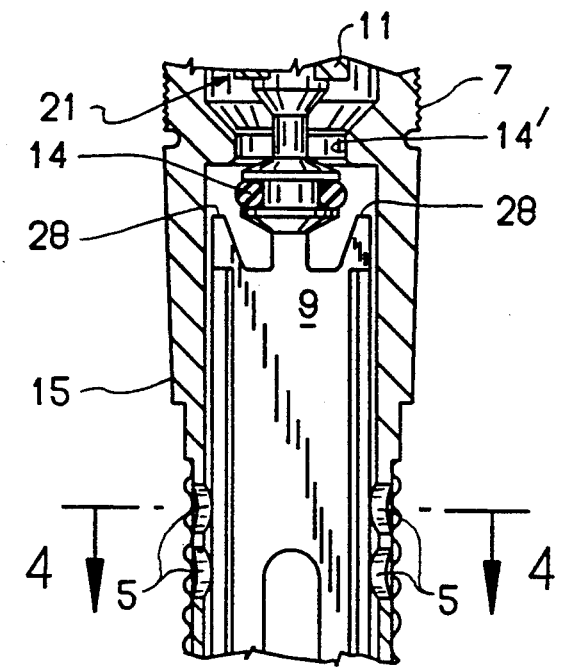
FIG. 3 is a partial cross-sectional view of the valve in the "on" position.

As shown in FIGS. 1 and 2, the fuel flow control valve of the present invention includes a hollow elongated valve body 1 having opposite ends 2 and 3. A first main fuel inlet 4 is provided at the end 3 of the valve body while a second fuel inlet, in the form of two pairs of reserve inlet openings 5, are located intermediate the ends 3 and 4 of the valve body. The valve body 1 in the area of the inlets 4 and 5 is covered by a filter screen 1'. Finally, a fuel outlet 6 is provided at the end 2 of the valve body.

The fuel valve body is adapted to be secured to a fuel tank by a threaded section 7 provided on the outer surface of the valve body intermediate the fuel inlets 5 and the fuel outlet 6. Such mounting will position the fuel inlets 4 and 5 internally of the fuel tank and the fuel outlet 6 externally of the tank.

The fuel control valve of the present invention is particularly suited for use with motorcycles. In such installations, the fuel valve will normally be secured to the bottom of the fuel tank. Thus, the inlet 4 will be used for the "on" position of the fuel valve when the fuel tank is nearly full and the level of fuel is above the end 3 of the valve body. The fuel inlets 5, on the other hand, will be used for the "reserve" position of the valve. The location of the fuel inlets 5 can be positioned properly with respect to the lower surface of the fuel tank by appropriately contouring the lower surface at the point of attachment of the valve to the tank.

For controlling the valve between the "off", "on" and "reserve" positions, a valve control means, generally designated at 8, is connected to the valve body for movement between the three positions of the valve. The valve control means includes a poppet member 9, a cam means 10, comprising a cam follower 11 and a cam 12, and spring means 13 engaging between a ring member 9' on the end of the poppet member 9 and a similar ring 3' at the end 3 of tubular body for normally urging the valve control to the "off" position of the valve, so as to close the fuel outlet 6 against receiving fuel fed to the valve through either of the inlets 4 or 5.

The closing of the valve is effected by an annular sealing member 14 engaging a sealing surface 14' formed on the wall member 15 of the valve body. As shown in FIGS. 1 and 2, the sealing member 14, which may be in the form of an O-ring, extending radially outwardly of the poppet member, whereas the sealing surface 14' of the valve body is a circumferential surface extending radially inwardly of the wall member 15 of the valve body. The sealing surface 14' is located axially along the valve body intermediately fuel inlets 5 and the threaded connecting surface 7 of the valve body. Thus, the location of sealing is disposed internally of the fuel tank when the valve is secured to the tank.

In the "off" position of the valve, as shown in FIGS. 1 and 2, the cam 12 is located within a groove 16 provided in the end of the cam follower 11. The cam can be in the form of a pin secured to the valve body by a valve cover 17. The pin extends radially inwardly to overlie the surface 18 of the cam follower, as well as the groove 16. One end 19 of the cam follower extends axially outwardly of the valve body through the cover 17; and a control handle 20 is suitably secured to the end 20 for manual control of the valve.

When it is desired to move the valve to the "on" position, the control handle 20 is rotated 90° from the position shown in FIG. 1 and 2. This rotation causes rotation of the cam follower 11 and, in turn, effects a corresponding rotation of the poppet member 9 through the connection 21 of the cam follower to the poppet member. For the reasons more fully explained below, this connection is a releasable connection whereby the cam follower 11 can be readily disconnected from the poppet member 9.

Upon rotation of the handle 20 and the cam follower 11, the groove 16 of the cam follower moves out of engagement with the cam pin 12 by the pin 12 riding up the sloped surface of the groove 16 until the pin overlies the flat and surface 18 of the cam follower. It will be noted that as this rotation occurs, the cam follower is forced to move toward the end 3 of the valve against the action of the spring 13. This in turn causes the poppet 9 to move in the same axial direction and to unseat the sealing member 14 from the sealing surface 14'.

The "on" position of the valve is shown in FIG. 3. There it can be seen that fuel entering the inlet 4 can pass between the sealing member 14 and the sealing surface 14' and out the fuel outlet 6. To facilitate this flow, the cam follower 11 is constructed as a fork member to define an internal slot 22 through which fuel can flow. This flow path avoids the guide 23 of the member 11, which guide rides against the internal wall surface of the valve body.

Figure 4:
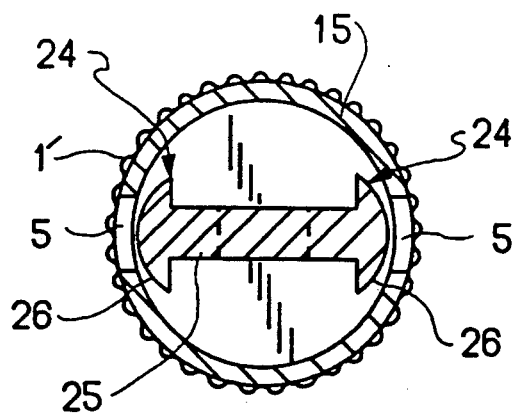
FIG. 4 is a cross-sectional view taken along lines 4—4 of FIG. 3.

In the "on" position of the valve, fuel not only flows into the valve through the fuel inlet 4, but also flows into the valve through the fuel inlets 5. This result is possible because of the construction of the poppet member. In particular, the poppet member is provided with fuel inlet closure means 24 connected together by a center web section 25. As shown in FIG. 4, in the assembled condition of the valve, the inlet closure means 24 are disposed on diametrically opposite sides of the wall member 15. Thus, when the valve is in the "on" position, the closure means 24 cover the similarly diametrically located reserve openings defined by the inlets 5.

While the closure means 24 cover the inlets 5, they do not completely close these inlets. Thus, a small amount of fuel can flow through the inlets 5 when the valve is in the "on" position. This flow will continue when the level of fuel in the tank reaches a point where no more fuel flows in through the main inlet 4. The amount of fuel allowed in the inlets 5 is such as to cause sputtering, but not a complete shutdown of the engine.

To provide for the restricted fuel flow through the inlets 5, the valve closure means 24 each have a valve surface 26 facing the inlets 5. Each of these surfaces is of a radius of curvature different from the radius of curvature of the internal wall surface of the wall member 15 of the valve body. More particularly, the radius of curvature of the surface 26 is less than the radius of curvature of the internal wall surface of the wall member 15.

Figure 5:
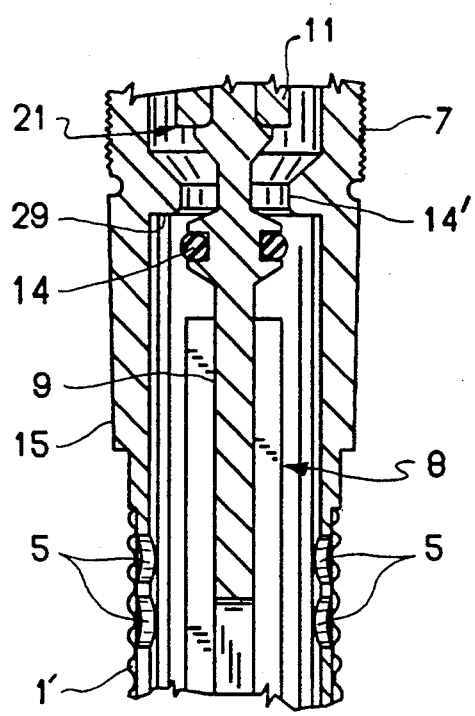
FIG. 5 is another partial cross-sectional view, similar to FIG. 3, showing the valve in the "reserve" position.
Figure 6:
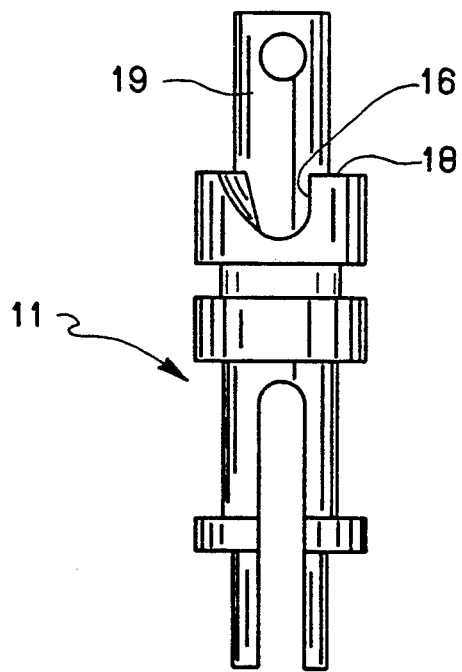
FIG. 6 is a side view of the cam means of the internal valve control of the valve.

When it is necessary to move the valve to the "reserve" position, the control handle 20 is rotated 90° from the "on" position. This moves the valve closure means 90° to the position shown in FIG. 5. The inlets 5 are thus fully opened and fuel at the required rate is permitted to flow through the valve.

As shown in FIGS. 1 and 2, the wall member 15 of the valve body includes an impact shear notch 27. This notch is located between the fuel outlet 6 and the threaded surface 7 by which the valve is connected to the wall of the fuel tank. The shear notch has a reduced wall thickness and thus a reduced strength relative to the thickness and strength of the wall member 15 immediately adjacent the notch.

Any severe impact against the exposed portions of the valve, as might occur in an accident, will cause the portion of the valve body located outwardly of the fuel tank to break away from the remaining portion of the valve body, this breaking occurring at the notch 27. At the same time, the cam follower 11 will be separated from the poppet member 9 due to the releasable connection at 21. As shown in FIG. 2, the location of the notch 27 is axially aligned so as to be located radially outwardly of the connection 21 of the cam follower 11 to the poppet member 9. Thus, all parts of the valve break away at the same location.

Once a break occurs, there is nothing acting against the spring 12; and it will quickly shift the poppet member to the "off" position of the valve with the sealing member 14 engaging the sealing surface 14'. Axial movement of the poppet member in this direction is limited by engagement of the ends 28 of the poppet member with the ledge 29 formed on the internal surface of the wall member 15.

We claim:

1. The improvement in a fuel flow control valve having a hollow elongated valve body with opposite ends, a first fuel inlet at one end thereof, a second fuel inlet intermediate said ends, a fuel outlet at the other end thereof, connecting means intermediate said second fuel inlet and said fuel outlet for securing said valve to the wall of a fuel tank with the fuel inlets disposed internally of the tank and the fuel outlet disposed externally of the tank, and valve control means connected to said body for movement between at least two positions, the first position corresponding to the "on" position of the valve permitting flow of fuel into one of said fuel inlets and out said fuel outlet and the second position corresponding to a "reserve" position of the valve permitting flow of fuel into the other of said fuel inlets and out said fuel outlet when the level of fuel in the tank is such as to preclude flow of fuel into the one inlet; the improvement wherein:
 a) the valve control means includes fuel inlet closure means movable therewith between an open position remote from the other of said fuel inlets upon movement of the valve control means to its second position and a fuel flow restricting position partially closing the other of said fuel inlets upon movement of the valve control means to its first position.

2. The improvement in the fuel control valve of claim 1 wherein:
 a) the valve body is defined by a hollow wall member having an internal surface;
 b) the other of said fuel inlets is defined by at least one reserve inlet opening extending through the wall member; and
 c) the fuel inlet closure means includes a valve surface partially covering said reserve inlet opening when said valve control means is in its first position to permit restricted flow of fuel through said reserve inlet opening.

3. The improvement in a fuel flow control valve having a hollow elongated valve body with opposite ends, a first fuel inlet at one end thereof, a second fuel inlet intermediate said ends, a fuel outlet at the other end thereof, connecting means intermediate said second fuel inlet and said fuel outlet for securing said valve to the wall of a fuel tank with the fuel inlets disposed internally of the tank and the fuel outlet disposed externally of the tank, and valve control means connected to said body for movement between at least two positions, the first position corresponding to the "on" position of the valve permitting flow of fuel into one of said fuel inlets and out said fuel outlet and the second position corresponding to a "reserve" position of the valve permitting flow of fuel into the other of said fuel inlets and out said fuel outlet when the level of fuel in the tank is such as to preclude flow of fuel into the one inlet; the improvement wherein:
 a) the valve control means includes fuel inlet closure means movable therewith between an open position remote from the other of said fuel inlets upon movement of the valve control means to its second position and a fuel flow restricting position partially closing the other of said fuel inlets upon movement of the valve control means to its first position;
 b) the valve body is defined by a tubular wall member having an internal surface with a first radius of curvature along an area thereof;
 c) the other of said fuel inlets is defined by at least one reserve inlet opening extending through the wall member in said area of the internal surface thereof;
 d) the valve control means is disposed within said tubular wall member; and
 e) the fuel inlet closure means includes at least one valve surface covering said reserve inlet openings when said valve control means is in its first position, said valve surface having a second radius of curvature different from said first radius of curvature to permit restricted flow of fuel through said reserve inlet opening.

4. The improvement in the fuel control valve of claim 3 wherein:
 a) each valve surface has a radius of curvature less than said first radius of curvature.

5. The improvement in the fuel control valve of claim 4 wherein:
 a) the valve body is defined by a cylindrical wall member;
 b) the valve control means includes a poppet member mounted within said wall member for rotational movement between said first and second positions thereof;
 c) the other of said fuel inlets is defined by two pairs of reserve inlet openings extending through said wall member on diametrically opposite sides thereof with the openings each pair being axially spaced along said wall member;
 d) said poppet member includes a fuel inlet closure means located on diametrically opposite sides of the wall member of the valve body;
 e) said valve surface of each of said fuel inlet closure means faces radially outwardly toward the reserve inlet openings of each of said pairs when said valve control means is in its first position.

6. The improvement in the fuel control valve of claim 5 wherein:
 a) the first and second positions of said valve control means are rotationally spaced at 90°.

7. The improvement in a fuel flow control valve having a hollow elongated valve body with opposite ends, a first fuel inlet at one end thereof, a second fuel inlet intermediate said ends, a fuel outlet at the other end thereof, connecting means intermediate said second fuel inlet and said fuel outlet for securing said valve to the wall of a fuel tank with the fuel inlets disposed internally of the tank and the fuel outlet disposed externally of the tank, and valve control means connected to said body for movement between at least two positions, the first position corresponding to the "on" position of the valve permitting flow of fuel into one of said fuel inlets and out said fuel outlet and the second position corresponding to a "reserve" position of the valve permitting flow of fuel into the other of said fuel inlets and out said fuel outlet when the level of fuel in the tank is such as to preclude flow of fuel into the one inlet; the improvement wherein:
 a) the valve control means includes fuel inlet closure means movable therewith between an open position remote from the other of said fuel inlets upon movement of the valve control means to its second position and a fuel flow restricting position partially closing the other of said fuel inlets upon movement of the valve control means to its first position;
 b) the valve body is defined by a hollow wall member having an internal surface;

c) the other of said fuel inlets is defined by at least one reserve inlet opening extending through the wall member;

d) the fuel inlet closure means includes a valve surface partially covering said reserve inlet opening when said valve control means is in its first position to permit restricted flow of fuel through said reserve inlet opening;

e) the valve control means is connected to said body for movement between three positions, the third position corresponding to the "off" position of the valve wherein the fuel outlet is closed against flow of fuel therethrough; and f) the fuel inlet closure means of said valve control means is mounted for axial movement to and from said third position of the valve control means.

8. The improvement in the fuel control valve of claim 7 wherein:

a) the valve control means further includes:
   i) spring means for urging said poppet member axially toward the Other end of said valve body and into said third position;
   ii) cam means rotatably mounted in that other end of said valve body, said cam means being removably connected to said poppet member for controlling its movement between said first, second and third positions; and
   iii) handle means connected to said cam means externally of the valve body at the other end thereof for controlling movement of said cam means.

9. The improvement in the fuel valve of claim 8 wherein:

a) the valve body includes a shear notch located between said fuel outlet and said connecting means for securing the valve to the wall of a fuel tank, said shear notch having a reduced wall thickness and strength relative to the thickness and strength of the valve body immediately adjacent thereto.

10. The improvement in the fuel valve of claim 9 wherein:

a) the shear notch is located radially outwardly of the connection of the cam means to the poppet member.

* * * * *

UNITED STATES PATENT AND TRADEMARK OFFICE
CERTIFICATE OF CORRECTION

PATENT NO.   :   5,211,194

DATED        :   May 18, 1993

INVENTOR(S)  :   Richard E. Scott, Thomas G. Morgan and James Cline

It is certified that error appears in the above-identified patent and that said Letters Patent is hereby corrected as shown below:

Column 1, line 29, after "valve" delete "o".

Column 2, line 16, after "valve" delete "o".

Column 2, line 35, "evalational" should read -- elevational --.

Signed and Sealed this

Seventh Day of June, 1994

Attest:

BRUCE LEHMAN

*Attesting Officer*    *Commissioner of Patents and Trademarks*